Figure 1:
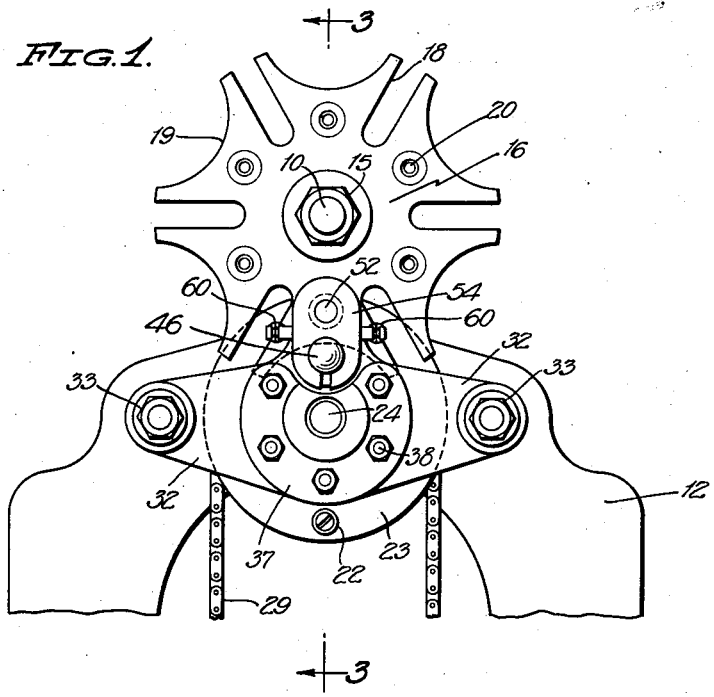

April 17, 1945.  C. WEIDAUER ET AL  2,373,796
INDEXING MECHANISM
Filed Aug. 22, 1942   2 Sheets-Sheet 1

CURTIS WEIDAUER
KARL A. DOEHM.
INVENTORS.

BY Ely Pattison
ATTORNEYS.

WITNESS:

April 17, 1945.  C. WEIDAUER ET AL  2,373,796
INDEXING MECHANISM
Filed Aug. 22, 1942   2 Sheets-Sheet 2
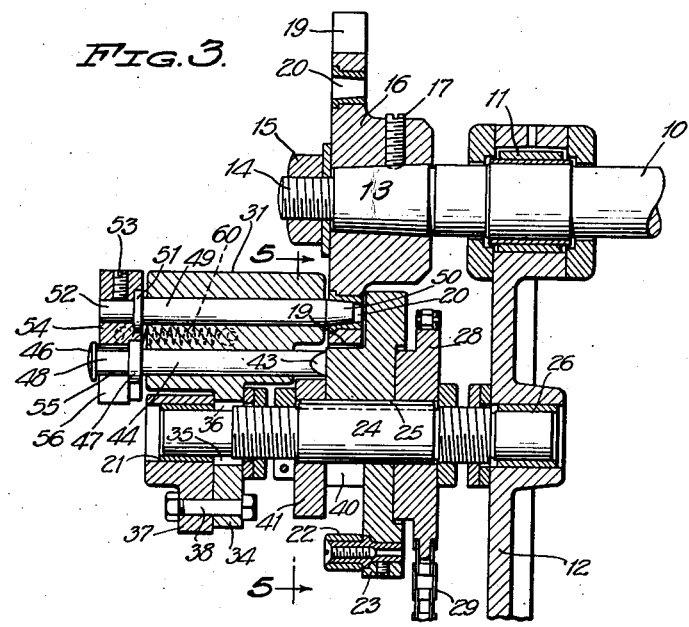
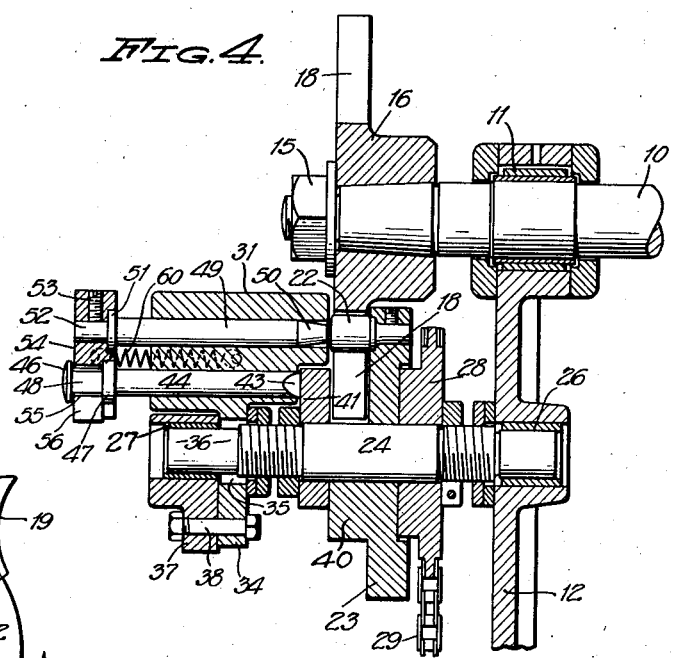
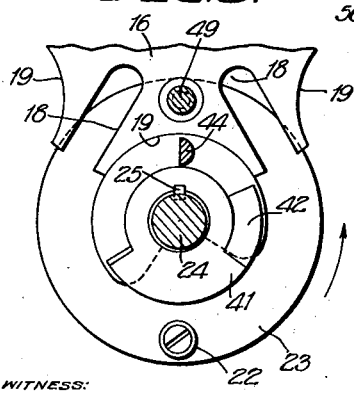
CURTIS WEIDAUER
KARL A. DOEHM
INVENTORS.
BY Ely & Pattison
ATTORNEYS.

Patented Apr. 17, 1945

2,373,796

UNITED STATES PATENT OFFICE 2,373,796

INDEXING MECHANISM

Curtis Weidauer, Manhasset, N. Y., and Karl A. Doehm, West New York, N. J., assignors to Samuel Briskman, New York, N. Y.

Application August 22, 1942, Serial No. 455,782

2 Claims. (Cl. 74—436)

This invention relates to new and useful improvements in indexing mechanisms for automatic machines and more particularly it pertains to the indexing mechanism illustrated in our copending application for automatic machine filed November 27, 1941, Serial Number 420,660.

Generally speaking, the indexing mechanism which forms the subject matter of the present application is of the type which employs a mechanical movement, generally known as the Geneva movement.

The use of the Geneva movement as the controlling element of an indexing mechanism for automatic machines, is in itself not new and under certain operating conditions has proven highly satisfactory.

Under certain operating conditions, however, and especially where tolerances are extremely slight and where a high degree of accuracy is required, the Geneva movement as commonly known and constructed does not meet the requirements in a satisfactory manner.

It is the object of the present invention to provide a novel indexing mechanism which includes a Geneva movement which is in itself an improved type.

In the Geneva movement as generally constructed, the star wheel is held in its positions of rest by a rotating member known as a star wheel lock. The star wheel lock, unless very accurately constructed and also through wear will permit of slight movements of the star wheel which movements render the device impractical in machines wherein a high degree of accuracy must be obtained.

It is one object of the present invention to provide a locking means for the star wheel which acts in addition to the conventional star wheel lock, to positively lock the star wheel against any movement during the periods through which it should be at rest.

It is a further object of the invention to provide a locking means which will serve also to accurately position the star wheel when the same is brought to its positions of rest.

Other objects of the invention will become obvious as the nature thereof is better understood for which purpose reference will be had to the accompanying drawings, the following specification and the appended claims.

Figure 2:
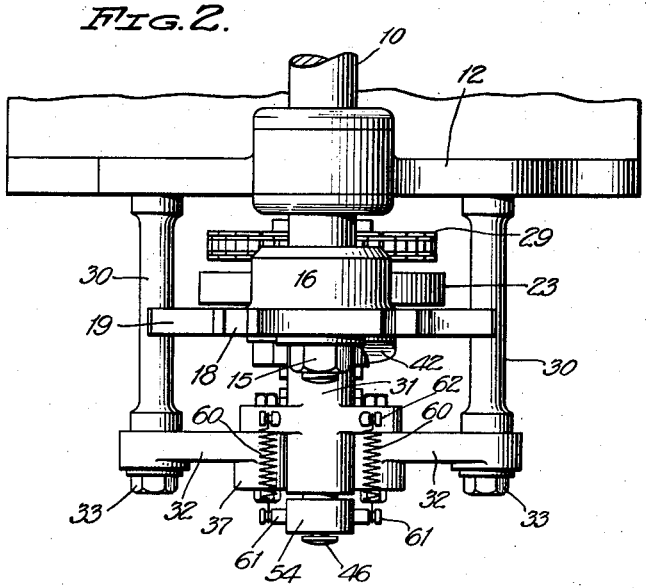

In the drawings,

Figure 1 is a view in front elevation of an indexing mechanism constructed in accordance with the present invention, Figure 2 is a top plan view thereof, Figure 3 is a sectional view on an enlarged scale taken substantially on the line 3—3 of Figure 1, illustrating the parts in their star wheel locking position, Figure 4 is a view similar to Figure 3 illustrating the parts in their star wheel releasing position, and, Figure 5 is a detail sectional view taken substantially on the line 5—5 of Figure 4.

Referring to the accompanying drawings and particularly to Figure 3 thereof, the reference numeral 10, designates a shaft to which intermittent or step by step rotary motion is to be imparted by the indexing mechanism.

In our previous application above referred to, this shaft 10 carried a work carrier in which a plurality of pieces of work were successively presented to a number of tools. It is to be understood, however, that this invention is not to be limited to such application and that the indexing mechanism illustrated herein has broader applications and may be employed wherever intermittent or step by step motion may be required.

The shaft 10 may be rotatably mounted in a bearing 11 upon the upper end of a standard 12 or in any other manner depending upon the installation involved, the mounting thereof as herein illustrated being merely illustrative.

The shaft 10 has a projecting end 13 which is tapered, and a screw threaded extremity 14 upon which is threaded a nut, 15.

Mounted upon the tapered portion of the shaft 10, there is a star wheel 16 which is secured thereon by the nut 15 and keyed to rotate therewith by means of a set screw 17.

As best illustrated in Figure 1 of the drawings, the star wheel 16 has a plurality of spaced radially extending peripheral slots 18 and a plurality of curved peripheral seats 19 which are spaced from one another by the slots 18. Formed in the body portion of the star wheel 16 and interposed with respect to the radial slots 18 thereof, there is a circular series of equally spaced sockets 20 which are preferably tapered as best illustrated in Figure 3.

The star wheel 16 is intermittently driven by a driving pin 22 which is carried by a driving member 23 mounted upon a shaft 24 to which it is operatively connected by means of a key 25.

The shaft 24 is rotatably mounted in two bearings 26 and 27 and is driven by a sprocket wheel 28 also operatively connected to said shaft by the key 25. A driving chain 29 passes around the sprocket to drive the same and it may be operatively connected to any suitable source of power.

The bearing 26 is herein illustrated as being formed directly in the standard 12. The bearing 27 may also be supported from the standard 12 and the manner in which this is accomplished will be hereinafter specifically described.

Carried by and projecting from the standard 12, there are two studs 30, see Figures 1 and 2, and these studs form the means for supporting a housing 31, the housing having two arms or lugs 32 which receive the outer free ends of the studs 30 and which is secured thereto by means of nuts 33, threaded upon the studs 30.

Depending from the housing 31, see Figure 3, there is a lug 34 which has an opening 35 through which the outer end 36 of the shaft 24 projects into the bearing 27.

The bearing 27 is carried by a bearing housing 37 which is secured to the depending lug 34 by the bolt 38.

The driving member 23 has a hub extension 40 which, as the driving member rotates, successively engages the peripheral curved seats 19 of the star wheel to form the star wheel lock in the manner of the well known Geneva movement.

In addition to the star wheel lock, the present invention provides a separate positive lock for the star wheel which also serves as a means for accurately positioning the star wheel in its proper positions of rest.

Keyed to the shaft 24 by the key 25, there is a cam 41. As illustrated in Figure 5 of the drawings, this cam 41 has a short cam face 42 which, upon rotation of the cam member, engages a cam face 43, upon the end of a sliding bolt 44 which is slidably mounted in the housing 31, see Figure 3.

The outer end of the sliding bolt 44 projects beyond the housing, the extremity thereof being formed with a head 46, and spaced with respect to the head 46, there is a flange 47. Between the head 46 and the flange 47, the bolt is flattened as at 48 for a purpose which will hereinafter appear.

Slidably mounted in the housing 31, there is a second bolt 49, the inner end of which is tapered as at 50 for engagement with the tapered sockets 20 in the star wheel 16.

Near its outer end, the bolt 49 has a flange 51 and secured to the bolt between the flange 50 and its outer extremity 52 by means of a set screw 53, there is a coupling member 54.

This coupling member 54 has an opening 55, which receives the outer end of the bolt 44. Leading from the opening 55 of the coupling member there is a slot 56 which receives the flattened portion 48 of the bolt 44 in assembling the coupling member and said bolt.

The bolt 49 by reason of the engagement of its tapered end 50 with the tapered sockets 20 of the star wheel, serves as a locking means therefor and in addition, by reason of the tapered end 50 thereof engaging in tapered sockets in the star wheel, accurate positioning of the star wheel is assured.

Sliding bolt 44 serves as the operating bolt to effect disengagement of the locking bolt 49 relative to the star wheel 16, the coupling member 54 providing the operative connection between the operating bolt 44 and the locking bolt 49.

Means is provided to urge the locking bolt forwardly into engagement with the star wheel or the tapered sockets thereof and this means also, through the medium of engagement of the coupling member 54 with the flange 47 of the bolt 44, urges the operating bolt forwardly into engagement with the cam 41.

As best illustrated in Figure 2, this means consists of two coiled springs 60 each of which is connected at one end, as at 61 to the coupling member 54, and at the other end to the housing 31, as at 62.

In Figure 3 of the drawings, the star wheel lock 40 is shown in engagement with one of the curved peripheral seats 19 of the star wheel 16 and the tapered end 50 of the locking bolt 49 in engagement with one of the tapered sockets 20 of the star wheel 16.

With the parts in this position, the star wheel 16 is locked against rotary movement both by the star wheel lock 40 and the locking bolt 49.

As the shaft 24 is rotated, the driving pin 22 of the driving member 23 enters the proper radial slot 19 of the star wheel to impart a partial rotary movement to the star wheel. Simultaneously, the star wheel lock is rotated and in proper timing, the cam face 42 of the cam 41, engages the cam face 43 of the sliding bolt 44, moving the same to the left in Figure 3.

As the sliding bolt 44 moves under the influence of the cam face 42 of the cam 41, through the medium of the coupling member 54, the locking bolt 49 is moved to the left in said figure, and its tapered end 50 is withdrawn from engagement with the socket 20 of the star wheel 16, leaving the star wheel free for operation by the driving pin 22 of the driving member 23.

The cam face 42 of the cam member 41 is relatively short, but it is understood that it is of sufficient length to retain the locking bolt 49 out of engagement with the star wheel, a sufficient length of time to permit movement of the socket with which it was engaged to a point where the tapered end of the locking bolt will not engage said socket when it returns to engagement with the star wheel 16.

In Figure 4, the several parts are illustrated in their star wheel releasing position just described.

Having thus described the invention, what is claimed as new is:

1. An indexing mechanism comprising the combination of a driven member mounted for rotatory movement, driving means for intermittently driving said driven member, a rotary cam operated by said driving means, a sliding lock bolt, means acting on said bolt to move it into locking engagement with said driven member when the latter is at rest to lock the driven member against movement, a second sliding bolt, and means coupling said bolts for movement in unison, said second bolt being operable in response to the rotation of said cam to disengage said lock bolt from said driven member through the intervention of said coupling means, to enable the movement of the driven member by said driving means.

2. In indexing mechanism comprising the combination of a star wheel mounted for rotatory movement, driving means for intermittently driving said star wheel, a rotary cam operated by said driving means, a stationary housing, a sliding lock bolt supported by said housing, a second sliding bolt supported by said housing, a coupling member connected with said bolts so that they slide in unison, contractile springs each having its opposite ends connected with said housing and coupling member respectively, said springs through the intervention of said coupling member urging said bolts forwardly so that the locking bolt engages said star wheel when it is at rest to lock the star wheel against movement, and to constantly hold one end of the second bolt in contact with said cam, said second bolt being operable in response to the rotation of said cam, to disengage said lock bolt from said star wheel through the intervention of said coupling member, to enable the movement of said star wheel by said driving means.

CURTIS WEIDAUER.
KARL A. DOEHM.